United States Patent
Ji (10) Patent No.: US 12,086,025 B2
(45) Date of Patent: Sep. 10, 2024

(54) DATA TRANSMISSION CIRCUIT AND DATA TRANSMISSION METHOD

(71) Applicant: CHANGXIN MEMORY TECHNOLOGIES, INC., Anhui (CN)

(72) Inventor: Kangling Ji, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 169 days.

(21) Appl. No.: 17/810,015

(22) Filed: Jun. 30, 2022

(65) Prior Publication Data

US 2023/0267036 A1     Aug. 24, 2023

Related U.S. Application Data

(63) Continuation of application No. PCT/CN2022/087961, filed on Apr. 20, 2022.

(30) Foreign Application Priority Data

Feb. 24, 2022   (CN) .......................... 202210173567.3

(51) Int. Cl.
*G06F 11/07* (2006.01)
*G06F 13/40* (2006.01)

(52) U.S. Cl.
CPC ...... *G06F 11/0793* (2013.01); *G06F 11/0745* (2013.01); *G06F 13/4004* (2013.01)

(58) Field of Classification Search
None
See application file for complete search history.

(56) References Cited

U.S. PATENT DOCUMENTS

| | | |
|---|---|---|
| 4,661,955 A | 4/1987 | Arlington et al. |
| 5,257,271 A | 10/1993 | Lagadec et al. |

(Continued)

FOREIGN PATENT DOCUMENTS

| | | |
|---|---|---|
| CN | 1098528 A | 2/1995 |
| CN | 1156280 A | 8/1997 |

(Continued)

OTHER PUBLICATIONS

TW Office Action cited in TW111133603, mailed Apr. 27, 2023, 11 pages.

(Continued)

*Primary Examiner* — Guerrier Merant
(74) *Attorney, Agent, or Firm* — Kilpatrick Townsend & Stockton LLP (57) ABSTRACT

A data transmission circuit and a data transmission method applied to the data transmission circuit are provided. The data transmission circuit includes: a data strobe module, connected to multiple memory blocks, connected to a low-bit data port through a first group of data buses, and connected to a high-bit data port through a second group of data buses, where each group of data buses include an odd data line and an even data line; and an error correction module, where each group of the data buses are provided with the error correction module, the error correction module is provided on the odd data line or the even data line, and the error correction module is configured to perform error correction on data written through the low-bit data port or the high-bit data port.

14 Claims, 10 Drawing Sheets

(56) References Cited

U.S. PATENT DOCUMENTS

| | | | |
|---|---|---|---|
| 5,416,745 A | 5/1995 | Kawashima | |
| 6,522,581 B2 | 2/2003 | Takata et al. | |
| 8,041,890 B2 | 10/2011 | Wei | |
| 8,060,678 B2 | 11/2011 | Bohm | |
| 10,846,171 B2 | 11/2020 | Cho et al. | |
| 10,885,976 B2 | 1/2021 | Ha | |
| 11,314,592 B2 | 4/2022 | Song et al. | |
| 2002/0051401 A1 | 5/2002 | Lee | |
| 2006/0112239 A1 | 5/2006 | Ruckerbauer et al. | |
| 2006/0200728 A1 | 9/2006 | Nagai et al. | |
| 2008/0273362 A1 | 11/2008 | Srinivasan et al. | |
| 2020/0356437 A1* | 11/2020 | Son | G11C 11/4072 |
| 2021/0407576 A1 | 12/2021 | Shang et al. | |
| 2022/0115082 A1* | 4/2022 | Ock | G11C 16/225 |
| 2022/0156222 A1 | 5/2022 | Heldeis et al. | |
| 2022/0415403 A1* | 12/2022 | Bhat | G06F 3/0659 |

FOREIGN PATENT DOCUMENTS

| | | | |
|---|---|---|---|
| CN | 1804815 A | 7/2006 | |
| CN | 1832489 A | 9/2006 | |
| CN | 101281481 A | 10/2008 | |
| CN | 101354666 A | 1/2009 | |
| CN | 108447514 A | 8/2018 | |
| CN | 110858500 A | 3/2020 | |
| CN | 113094203 A | 7/2021 | |
| CN | 113470711 A | 10/2021 | |
| TW | 200820003 A | 5/2008 | |
| TW | 202046133 A | 12/2020 | |

OTHER PUBLICATIONS

International Search Report cited in PCT/CN2022/087961 mailed Sep. 27, 2022, 10 pages.

International Search Report cited in PCT/CN2022/087829 mailed Oct. 25, 2022, 8 pages.

European Search Report cited in EP22740275.7 mailed Dec. 5, 2023, 7 pages.

* cited by examiner

| In response to a data write request, write target data into a target memory block through a first-type data line or a second-type data line on which an error correction module is provided in a first group of data buses and a first-type data line or a second-type data line on which an error correction module is provided in a second group of data buses | S1 |

| In response to a data write request, write target data into a target memory block through a first-type data line or a second-type data line on which an error correction module is provided in a first group of data buses and a first-type data line or a second-type data line on which an error correction module is provided in a second group of data buses | S1 |

↓

| In response to a data read request, read the target data from the target memory block through the first group of data buses and the second group of data buses | S2 |

DATA TRANSMISSION CIRCUIT AND DATA TRANSMISSION METHOD

CROSS-REFERENCE TO RELATED APPLICATIONS

This is a continuation of International Application No. PCT/CN2022/087961, filed on Apr. 20, 2022, which claims the priority to Chinese Patent Application No. 202210173567.3, titled "DATA TRANSMISSION CIRCUIT AND DATA TRANSMISSION METHOD" and filed on Feb. 24, 2022. The entire contents of International Application No. PCT/CN2022/087961 and Chinese Patent Application No. 202210173567.3 are incorporated herein by reference.

TECHNICAL FIELD

The present disclosure relates to the technical field of integrated circuit (IC) manufacturing, and specifically, to a data transmission circuit and a data transmission method applied to the data transmission circuit.

BACKGROUND

In a memory, an error correction circuit is usually provided on a data line to check and perform error correction on data in transmission. In a circuit layout, the error correction circuit occupies a relatively large area. Therefore, a conventional data transmission circuit has a relatively large layout area.

It should be noted that the information disclosed above is merely intended to facilitate a better understanding of the background of the present disclosure, and thus may include information that does not constitute the prior art known to those of ordinary skill in the art.

SUMMARY

According to a first aspect of the present disclosure, a data transmission circuit is provided, including: a data strobe module, connected to multiple memory blocks, connected to a low-bit data port through a first group of data buses, and connected to a high-bit data port through a second group of data buses, where each group of data buses include an odd data line and an even data line; and an error correction module, where each group of the data buses are provided with the error correction module, the error correction module is provided on the odd data line or the even data line, and the error correction module is configured to perform error correction on data written through the low-bit data port or the high-bit data port.

According to a second aspect of the present disclosure, a data transmission method is provided, applied to the data transmission circuit according to any one of the foregoing descriptions, and including: in response to a data write request, writing target data into a target memory block through a first-type data line or a second-type data line on which an error correction module is provided in the first group of data buses and a first-type data line or a second-type data line on which an error correction module is provided in the second group of data buses, where the first group of data buses are connected to the low-bit data port, the second group of data buses are connected to the high-bit data port, and in the first group of data buses and the second group of data buses, one of the first-type data line and the second-type data line is provided with the error correction module, and the other is not provided with the error correction module.

It should be understood that the above general description and the following detailed description are only exemplary and explanatory, and should not be construed as a limitation to the present disclosure.

BRIEF DESCRIPTION OF THE DRAWINGS

The accompanying drawings incorporated into the specification and constituting part of the specification illustrate the embodiments of the present disclosure, and serve, together with the specification, to explain the principles of the present disclosure.

Apparently, the accompanying drawings in the following description show merely some embodiments of the present disclosure, and those of ordinary skill in the art may still derive other accompanying drawings from these drawings without creative efforts.

FIG. 4A to FIG. 4C are each a schematic diagram of data writing in a circuit shown in FIG. 2 according to the method shown in FIG. 3 according to an embodiment of the present disclosure;

FIG. 6A to FIG. 6C are each a schematic diagram of data reading in a circuit shown in FIG. 2 according to the method shown in FIG. 5 according to an embodiment of the present disclosure.

DETAILED DESCRIPTION

The exemplary implementations are described more comprehensively below with reference to the accompanying drawings. However, the exemplary implementations can be implemented in various forms and should not be construed as being limited to examples described herein. On the contrary, these implementations are provided such that the present disclosure is more comprehensive and complete, and fully conveys the concept of the exemplary implementations to those skilled in the art. The described features, structures, or characteristics may be incorporated into one or more implementations in any suitable manner. In the following description, many specific details are provided to give a full understanding of the implementations of the present disclosure. However, those skilled in the art will be aware that the technical solutions of the present disclosure may be practiced with one or more of the specific details omitted, or other methods, components, apparatuses, steps, and the like may be used. In other cases, the publicly known technical solutions are not illustrated or described in detail, so as to avoid overshadowing and obscuring various aspects of the present disclosure.

In addition, the accompanying drawings are merely schematic diagrams of the present disclosure, and identical reference numerals in the accompanying drawings denote identical or similar parts. Therefore, repeated description thereof will be omitted. Some of the block diagrams shown in the accompanying drawings are functional entities, and do not necessarily correspond to physically or logically independent entities. These functional entities may be implemented in the form of software, or implemented in one or more hardware modules or integrated circuits, or implemented in different networks and/or processor apparatuses and/or microcontroller apparatuses.

The following describes in detail the exemplary implementations of the present disclosure with reference to the accompanying drawings.

Figure 1:
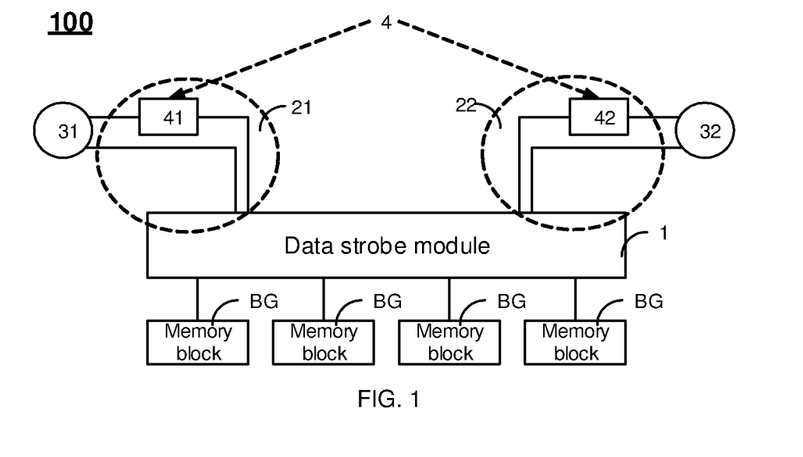
FIG. 1 is a schematic structural diagram of a data transmission circuit according to an exemplary embodiment of the present disclosure.

FIG. 1 is a schematic structural diagram of a data transmission circuit according to an exemplary embodiment of the present disclosure.

Referring to FIG. 1, the data transmission circuit 100 may include:

a data strobe module 1, connected to multiple memory blocks BG, connected to a low-bit data port 31 through a first group of data buses 21, and connected to a high-bit data port 32 through a second group of data buses 22, where each group of data buses include an odd data line and an even data line; and an error correction module 4, where each group of the data buses are provided with the error correction module 4, the error correction module 4 is provided on the odd data line or the even data line, and the error correction module 4 is configured to perform error correction on data written through the low-bit data port 31 or the high-bit data port 32. In this embodiment of the present disclosure, each memory block needs to exchange data with two data ports: the low-bit data port 31 and the high-bit data port 32. The low-bit data port and the high-bit data port respectively transmit high-bit data (high N bits) and low-bit data (low N bits) of 2N-bit data. In an embodiment, N is, for example, 4 or 8. When target data to be transmitted is 8 bits, the low-bit data port 31 is used to transmit (write or read) low four bits (bit 0 to bit 3) of the target data, and the high-bit data port 32 is used to transmit high four bits (bit 4 to bit 7) of the target data. When target data to be transmitted is 16 bits, the low-bit data port 31 is used to transmit (write or read) low eight bits (bit 0 to bit 7) of the target data, and the high-bit data port 32 is used to transmit high eight bits (bit 8 to bit 15) of the target data.

In the present disclosure, as an example, each piece of data is 16 bits, and the 16-bit target data may be divided into low eight bits and high eight bits for transmission. However, with subsequent technological development, the data may not be divided for once. That is, although this embodiment of the present disclosure shows only two groups of data buses to be respectively connected to the high-bit data port 32 and the low-bit data port 31, in other embodiments of the present disclosure, the data transmission circuit 100 may alternatively include multiple groups of data buses, and each group of data buses are connected to a different data port. Each group of data buses are provided with an error correction module 4. Each group of data buses include two or more types of data lines. Only one type of data line on each group of data buses is provided with the error correction module 4, and the other type of data line or other types of data lines is or are not provided with the error correction module 4.

In the embodiment shown in FIG. 1, the error correction module 4 includes a first error correction module 41 provided on the first group of data buses 21 and a second error correction module 42 provided on the second group of data buses 22. The error correction module (Link ECC) is configured to check and perform error correction on data.

In this embodiment of the present disclosure, error correction modules of different groups of the data buses may be provided on a same type of data line. For example, both the first error correction module 41 and the second error correction module 42 are provided on the odd data line, or both the first error correction module 41 and the second error correction module 42 are provided on the even data line. In other embodiments, the first error correction module 41 may be provided on the odd data line and the second error correction module 42 may be provided on the even data line, or the first error correction module 41 is provided on the even data line and the second error correction module 42 is provided on the odd data line. This may be set voluntarily by those skilled in the art according to actual situations.

In a memory circuit, data is sampled by using an odd clock and an even clock to obtain data that needs to be transmitted. Data sampled by using the odd clock is referred to as odd data, and data sampled by using the even clock is referred to as even data. The odd data and the even data are alternately transmitted to increase a transmission capacity of the data line. In addition, the parallel odd data line and even data line alternate in timing during transmission of the odd data and the even data, such that crosstalk between the data lines can be avoided. In the related art, due to a relatively long calculation time of the error correction circuit for checking and error correction, the odd data and the even data cannot be simultaneously processed. Usually, both the odd data line and the even data line are provided with the error correction circuit, to implement checking and error correction of the alternately appearing odd data and even data.

In this embodiment of the present disclosure, an error correction module that can check and perform error correction on both odd data and even data is provided only on an odd data line or an even data line during alternate transmission of the odd data and the even data, that is, only one error correction module is provided, such that a circuit layout area of a data transmission circuit can be greatly saved, thereby making a chip to which the data transmission circuit is applied have a smaller size or accommodate more functional circuits in a same volume.

Figure 2:
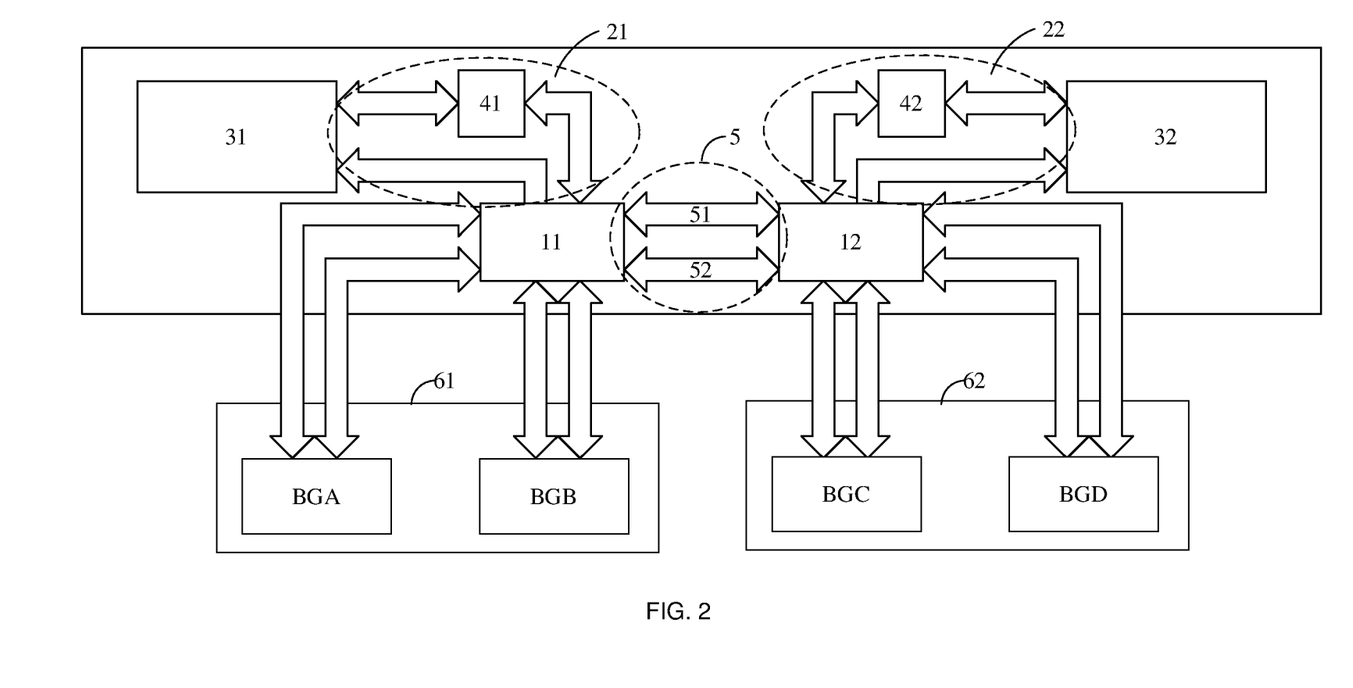
FIG. 2 is a schematic diagram of a connection relationship of a data strobe module shown in FIG. 1 according to an embodiment of the present disclosure.

FIG. 2 is a schematic diagram of a connection relationship of a data strobe module 1 shown in FIG. 1 according to an embodiment of the present disclosure.

Referring to FIG. 2, in an exemplary embodiment of the present disclosure, the data strobe module 1 may include a first data strobe 11 and a second data strobe 12. The first data strobe 11 is connected to a first group of memory blocks 61 and is connected to the low-bit data port 31 through the first group of data buses 21. The second data strobe 12 is connected to a second group of memory blocks 62 and is connected to the high-bit data port 32 through the second group of data buses 22. A transmission bus 5 is provided between the first data strobe 11 and the second data strobe 12.

In an exemplary embodiment of the present disclosure, the transmission bus 5 includes at least a first transmission bus 51 and a second transmission bus 52 to implement simultaneous transmission of at least two paths of data. In other embodiments of the present disclosure, more transmission buses may be provided to transmit more data in parallel.

In an exemplary embodiment of the present disclosure, the first group of memory blocks 61 include a first memory block BGA (Bank Group A) and a second memory block BGB (Bank Group B), and the second group of memory blocks 62 include a third memory block BGC (Bank Group C) and a fourth memory block BGD (Bank Group D). Each memory block exchanges data with a data strobe through two data lines, where one data line is used to transmit high-bit data, and the other data line is used to transmit low-bit data.

In other embodiments, the first group of memory blocks 61 and the second group of memory blocks 62 may further include more memory blocks. The present disclosure is not limited to this.

In the embodiment shown in FIG. 2, a relatively small circuit layout can be achieved by providing one error correction module only on an odd data line or an even data line of a group of data buses to implement reading or writing for four or more memory blocks. For a detailed reading or writing process, refer to the following method embodiments of the present disclosure.

Figure 3:
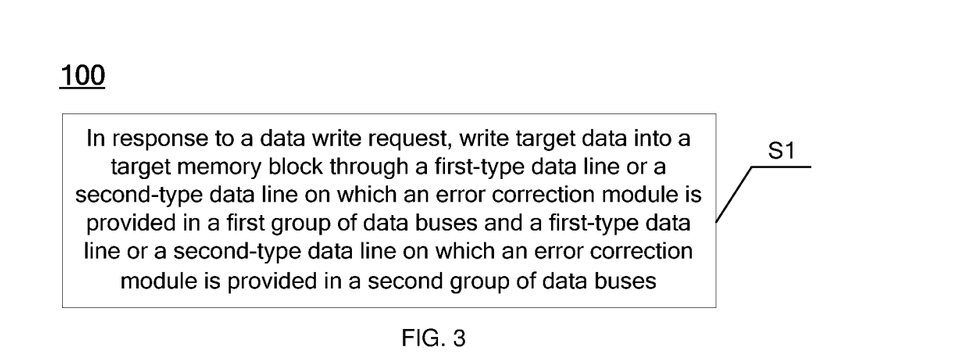
FIG. 3 is a flowchart of a data transmission method according to an exemplary embodiment of the present disclosure.

FIG. 3 is a flowchart of a data transmission method according to an exemplary embodiment of the present disclosure. The data transmission method shown in FIG. 3 may be applied to the data transmission circuit shown in FIG. 1 or FIG. 2.

Referring to FIG. 3, the data transmission method 300 may include:

Step S1. In response to a data write request, write target data into a target memory block through a first-type data line or a second-type data line on which an error correction module is provided in the first group of data buses and a first-type data line or a second-type data line on which an error correction module is provided in the second group of data buses, where the first group of data buses are connected to the low-bit data port, the second group of data buses are connected to the high-bit data port, and in the first group of data buses and the second group of data buses, one of the first-type data line and the second-type data line is provided with the error correction module, and the other is not provided with the error correction module.

In an exemplary embodiment of the present disclosure, the first-type data line is an odd data line, and the second-type data line is an even data line; or the first-type data line is an even data line, and the second-type data line is an odd data line.

A detailed procedure of the method shown in FIG. 3 is described below with reference to the circuit shown in FIG. 2.

Figure 4A:
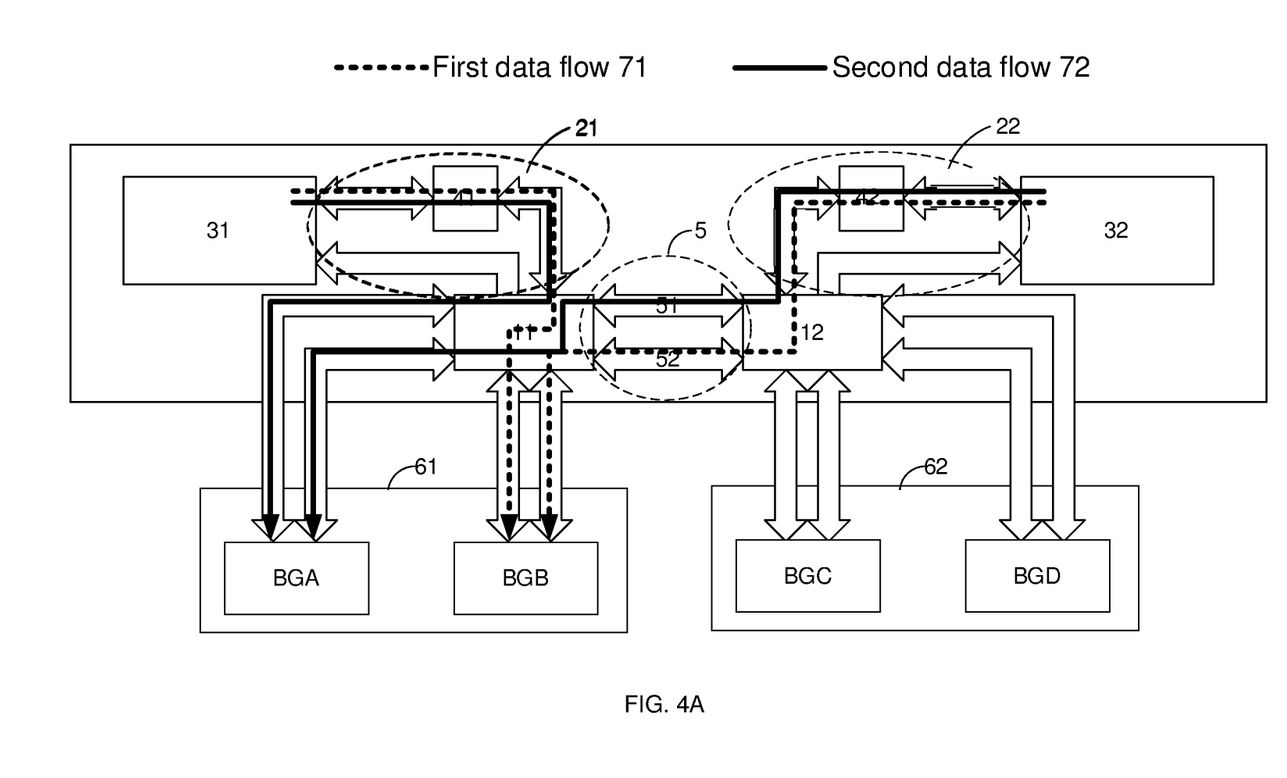
Figure 4B:
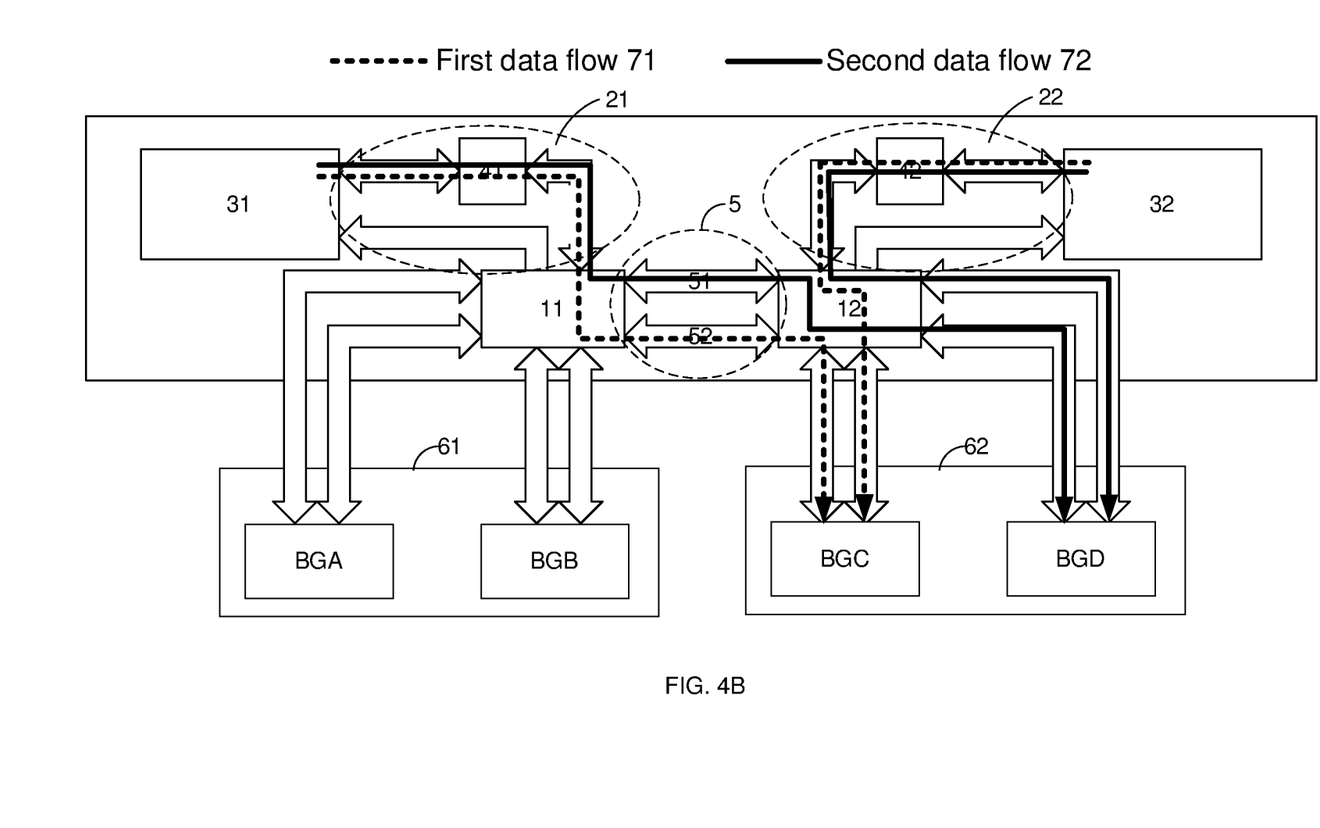
Figure 4C:
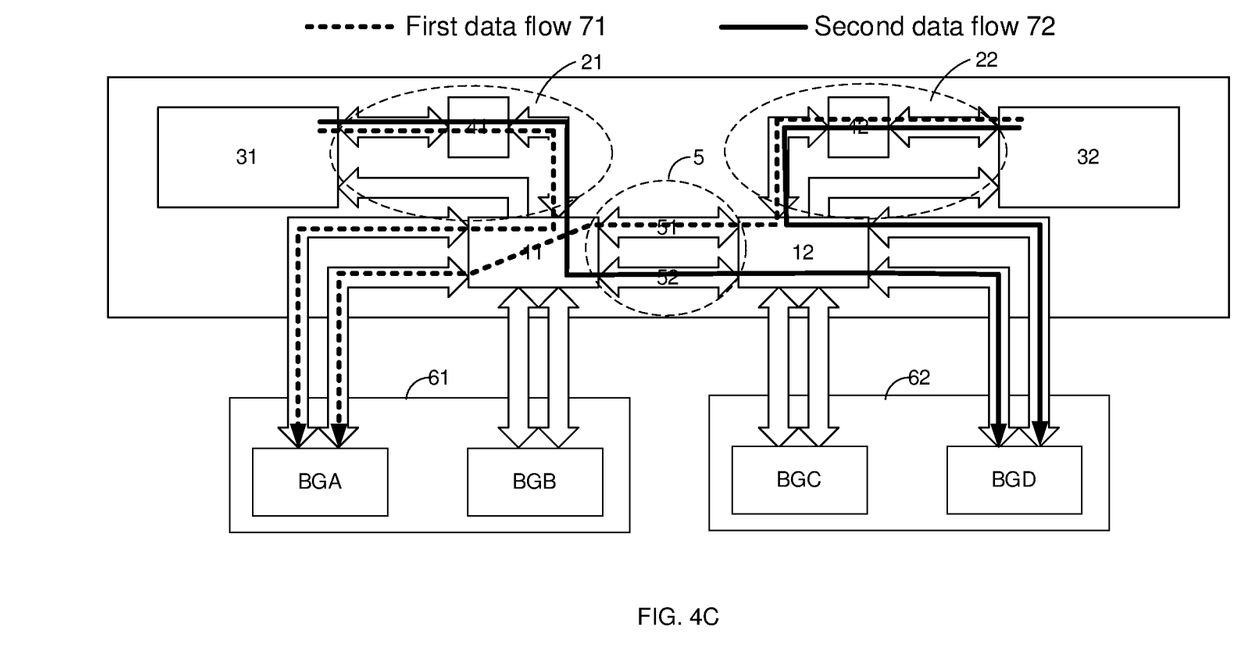

FIG. 4A to FIG. 4C are each a schematic diagram of data writing in a circuit shown in FIG. 2 according to the method shown in FIG. 3 according to an embodiment of the present disclosure.

Referring to FIG. 4A to FIG. 4C, in this embodiment of the present disclosure, the first group of data buses 21 are connected to the first data strobe 11, the first data strobe 11 is connected to the first group of memory blocks 61, the second group of data buses 22 are connected to the second data strobe 12, the second data strobe 12 is connected to the second group of memory blocks 62, and the transmission bus 5 is provided between the first data strobe 11 and the second data strobe 12. During alternate writing of first data and second data within one period, low-bit data of the first data and low-bit data of the second data are written through the first data strobe 11 and a first-type data line on which a first error correction module 41 is provided in the first group of data buses 21, and high-bit data of the first data and high-bit data of the second data are written through the second data strobe 12 and a first-type data line in the second group of data buses 22.

For a data write operation, data is obtained from the data bus based on a sample clock, and because a distance from the data bus to the data port remains unchanged, data from different memory blocks may be alternately written stably based on a same sample clock. In this way, an area of the error correction module can be saved, and only the first-type data line (for example, the odd data line, Odd DQ Bus) is used to perform error correction on data.

In FIG. 4A to FIG. 4C, a first data flow 71 is used to represent a transmission direction and a transmission path of the first data, and a second data flow 72 is used to represent a transmission direction and a transmission path of the second data. The embodiment shown in FIG. 4A to FIG. 4C is applicable to alternate data writing into two memory blocks (BG) within one transmission period T (a time interval between adjacent data on the data line), and a time interval for writing the two memory blocks is, for example, T/2.

Referring to FIG. 4A, during alternate writing of both the first data and the second data into the first group of memory blocks 61 within one period, the high-bit data of the first data and the high-bit data of the second data are written into the first group of memory blocks 61 through the first-type data line in the second group of data buses 22, the second data strobe 12, the two transmission buses (the first transmission bus 51 and the second transmission bus 52) in the transmission bus 5, and the first data strobe 11.

Referring to FIG. 4B, during alternate writing of both the first data and the second data into the second group of memory blocks 62, the low-bit data of the first data and the low-bit data of the second data are written into the second group of memory blocks 62 through the first-type data line in the first group of data buses 21, the first data strobe 11, the two transmission buses in the transmission bus 5, and second data strobe 12.

Referring to FIG. 4C, in an exemplary embodiment of the present disclosure, the transmission bus 5 (Cross Bus) includes at least a first transmission bus 51 (Even Cross Bus) and a second transmission bus 52 (Odd Cross Bus), so as to simultaneously transmit two paths of data of a same direction or different directions through different transmission buses when the transmission bus 5 needs to be responsible for simultaneous transmission of the two paths of data, thereby reducing mutual interference between the data. In other embodiments of the present disclosure, more transmission buses may be provided to transmit more data in parallel.

During respective writing of the first data and the second data into the first group of memory blocks 61 and the second group of memory blocks 62, the low-bit data of the first data is written into the first group of memory blocks 61 through the first-type data line in the first group of data buses 21 and the first data strobe 11; the high-bit data of the first data is written into the first group of memory blocks 61 through the first-type data line in the second group of data buses 22, the second data strobe 12, the first transmission bus 51, and the first data strobe 11; the low-bit data of the second data is written into the second group of memory blocks 62 through the first-type data line in the first group of data buses 21, the first data strobe 11, the second transmission bus 52, and the second data strobe 12; and the high-bit data of the second data is written into the second group of memory blocks 62 through the first-type data line in the second group of data buses 22 and the second data strobe 12.

Figure 5:
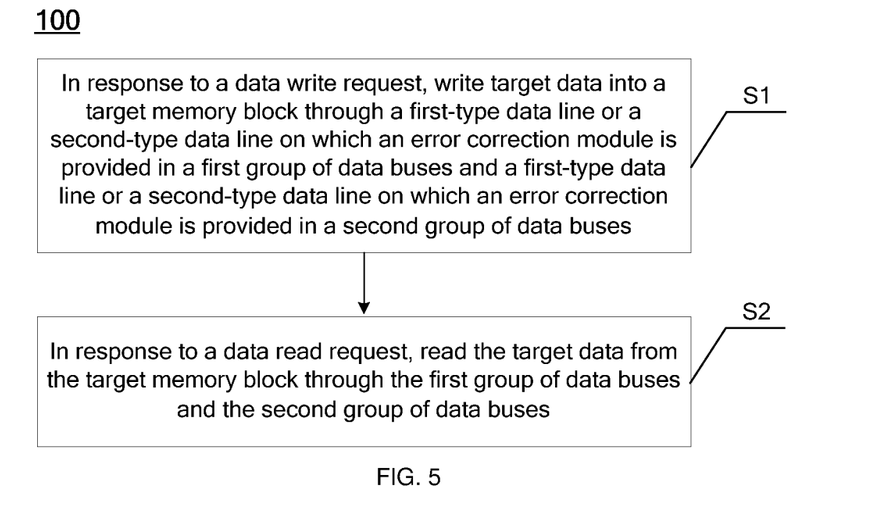
FIG. 5 is a flowchart of a data transmission method according to another embodiment of the present disclosure.

FIG. 5 is a flowchart of a data transmission method according to another embodiment of the present disclosure.

Referring to FIG. 5, in another exemplary embodiment of the present disclosure, the data transmission method 300 further includes:

Step S2. In response to a data read request, read the target data from the target memory block through the first group of data buses 21 and the second group of data buses 22.

For a data read operation, data is obtained from different storage locations, and each block has a different data timing, that is, even for a same memory block, a data timing varies with a voltage and a temperature. Therefore, in order to ensure data integrity, in this embodiment of the present disclosure, data read from different memory blocks is set to be randomly put on different first-type data lines or second-type data lines and different transmission buses (Cross Bus) for transmission to a data port. In this case, a data effective time for each memory block is relatively sufficient. When a same operation is performed on two memory blocks in succession, one of the memory blocks may use a first-type data bus (for example, an odd data line, Odd Bus), and the other of the memory blocks may use a second-type data bus (for example, an even data line, Even Bus), thereby reducing interference between data and implementing stable and efficient data transmission.

Figure 6A:
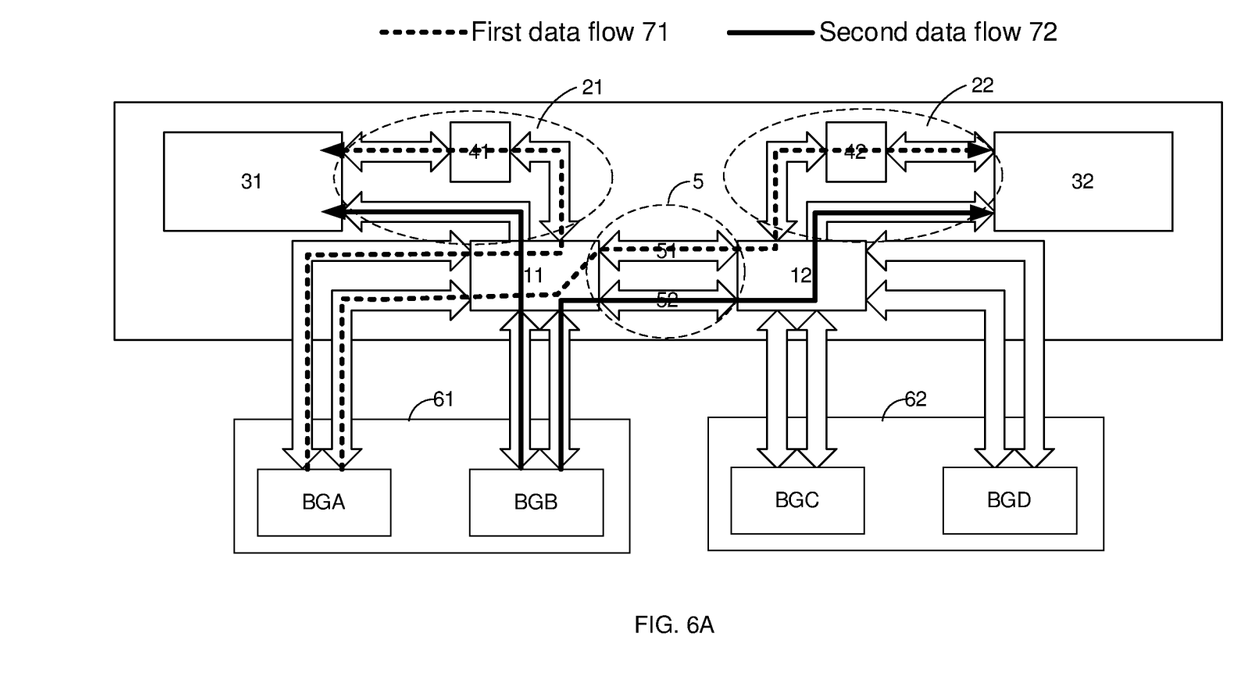
Figure 6B:
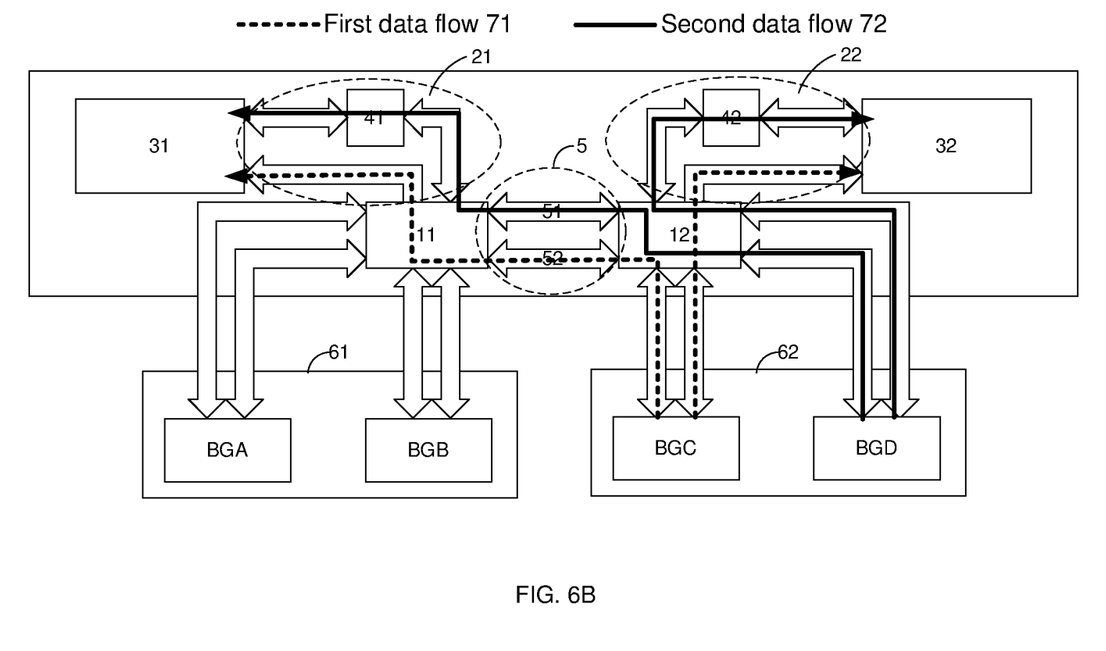
Figure 6C:
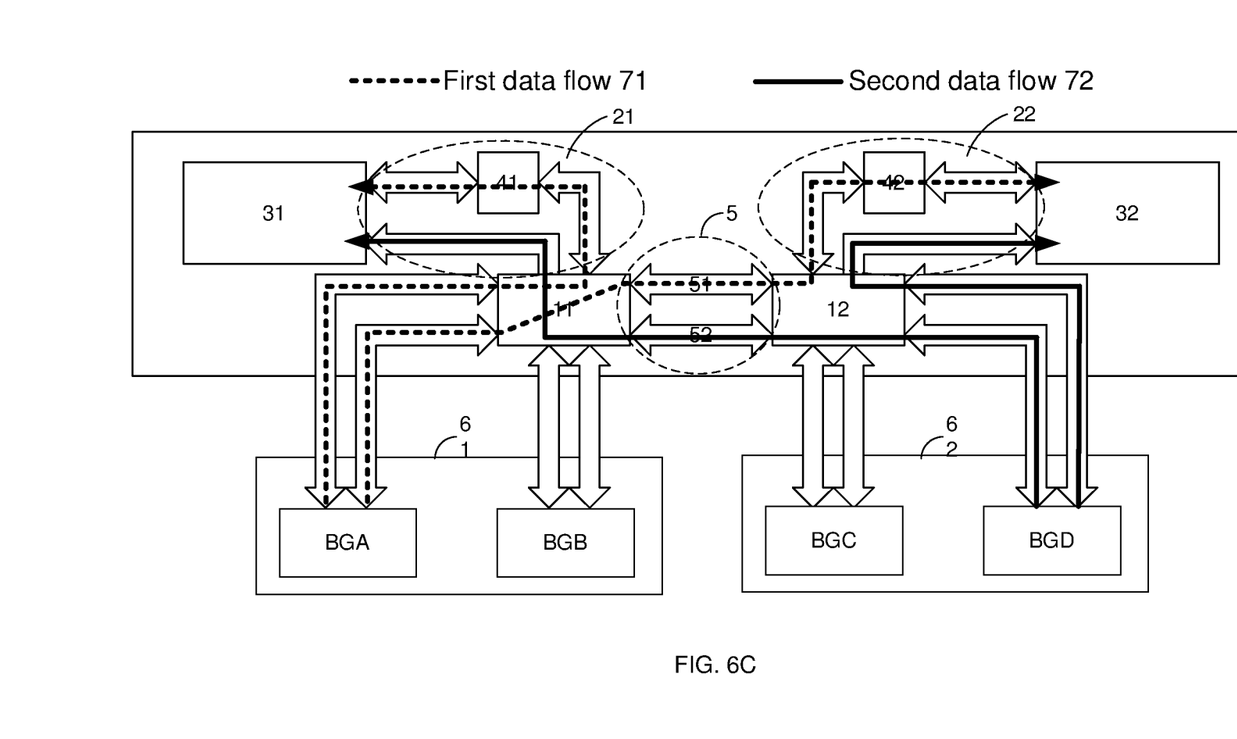

FIG. 6A to FIG. 6C are each a schematic diagram of data reading in a circuit shown in FIG. 2 according to the method shown in FIG. 5 according to an embodiment of the present disclosure.

Referring to FIG. 6A to FIG. 6C, in an exemplary embodiment of the present disclosure, the first group of data buses 21 are connected to the first data strobe 11, the first data strobe 11 is connected to the first group of memory blocks 61, the second group of data buses 22 are connected to the second data strobe 12, the second data strobe 12 is connected to the second group of memory blocks 62, and the transmission bus 5 is provided between the first data strobe 11 and the second data strobe 12.

Referring to FIG. 6A to FIG. 6C, when the target data is stored in the first group of memory blocks 61, low-bit data of the target data is read to the low-bit data port 31 through the first data strobe 11 and the first-type data line in the first group of data buses 21, and high-bit data of the target data is read to the high-bit data port 32 through the first data strobe 11, the transmission bus 5, the second data strobe 12, and the first-type data line in the second group of data buses 22.

When the target data is stored in the second group of memory blocks 62, high-bit data of the target data is read to the high-bit data port 32 through the second data strobe 12 and the first-type data line in the second group of data buses 22, and low-bit data of the target data is read to the low-bit data port 31 through the second data strobe 12, the transmission bus 5, the first data strobe 11, and the first-type data line in the first group of data buses 21.

In the embodiment shown in FIG. 6A to FIG. 6C, the target data includes first data and second data, and the first data and the second data are stored in a same group of memory blocks. The embodiment shown in FIG. 6A to FIG. 6C is applicable to data reading for two memory blocks (BG) within one transmission period T (a time interval between adjacent data on the data line), and a time interval for reading the two memory blocks is, for example, T/2.

In FIG. 6A to FIG. 6C, a first data flow 71 is used to represent a transmission direction and a transmission path of the first data, and a second data flow 72 is used to represent a transmission direction and a transmission path of the second data.

Referring to FIG. 6A, when both the first data and the second data are stored in the first group of memory blocks 61, low-bit data of the first data is read to the low-bit data port 31 through the first data strobe 11 and the first-type data line in the first group of data buses 21, and high-bit data of the first data is read to the high-bit data port 32 through the first data strobe 11, the transmission bus 5, the second data strobe 12, and the first-type data line in the second group of data buses 22; and low-bit data of the second data is read to the low-bit data port 31 through the first data strobe 11 and the second-type data line in the first group of data buses 21, and high-bit data of the second data is read to the high-bit data port 32 through the first data strobe 11, the transmission bus 5, the second data strobe 12, and the second-type data line in the second group of data buses 22.

Referring to FIG. 6B, when both the first data and the second data are stored in the second group of memory blocks 62, high-bit data of the first data is read to the high-bit data port 32 through the second data strobe 12 and the first-type data line in the second group of data buses 22, and low-bit data of the first data is read to the low-bit data port 31 through the second data strobe 12, the transmission bus 5, the first data strobe 11, and the first-type data line in the first group of data buses 21; and high-bit data of the second data is read to the high-bit data port 32 through the second data strobe 12 and the second-type data line in the second group of data buses 22, and low-bit data of the second data is read to the low-bit data port 31 through the second data strobe 12, the transmission bus 5, the first data strobe 11, and the second-type data line in the first group of data buses 21.

Referring to FIG. 6C, in an exemplary embodiment of the present disclosure, the target data includes first data and second data, the first data and the second data are respectively stored in the first group of memory blocks 61 and the second group of memory blocks 62, and the transmission bus 5 includes the first transmission bus 51 and the second transmission bus 52.

In this case, low-bit data of the first data is read to the low-bit data port 31 through the first data strobe 11 and the first-type data line in the first group of data buses 21, and high-bit data of the first data is read to the high-bit data port 32 through the first data strobe 11, the first transmission bus 51, the second data strobe 12, and the first-type data line in the second group of data buses 22; and high-bit data of the second data is read to the high-bit data port 32 through the second data strobe 12 and the second-type data line in the second group of data buses 22, and low-bit data of the second data is read to the low-bit data port 31 through the second data strobe 12, the second transmission bus 52, the first data strobe 11, and the second-type data line in the first group of data buses 21.

The data transmission method provided in the embodiments of the present disclosure can implement high-speed transmission of data while saving a layout area of a data transmission circuit.

It should be noted that although a number of modules or units of the device for execution are mentioned in the detailed description above, this division is not mandatory. In fact, according to the implementations of the present disclosure, the features and functions of two or more modules or units described above may be embodied in one module or unit. Correspondingly, the features and functions of a module or unit described above may be further divided into a plurality of modules or units to be embodied.

Those skilled in the art may easily figure out other implementation solutions of the present disclosure after considering the specification and practicing the application disclosed herein. This application is intended to cover any variations, purposes or adaptive changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and concept of the present disclosure are specified by the appended claims.

INDUSTRIAL APPLICABILITY

In the embodiments of the present disclosure, providing only one error correction module on an odd data line or an even data line in a data bus can greatly save a layout area of a data transmission circuit.

The invention claimed is:

1. A data transmission circuit, comprising:
   a data strobe circuit, connected to multiple memory blocks, connected to a low-bit data port through a first group of data buses, and connected to a high-bit data port through a second group of data buses, wherein each of the first group of data buses and the second group of data buses comprise an odd data line and an even data line; and
   two error correction circuits, wherein a first error correction circuit of the two error correction circuits is provided on the first group of data buses, a second error correction circuit of the two error correction circuits is provided on the second group of data buses, the two error correction circuits are provided on the odd data line or the even data line, the first error correction circuit is configured to perform error correction on data written through the low-bit data port, and the second error correction circuit is configured to perform error correction on data written through the high-bit data port.

2. The data transmission circuit according to claim 1, wherein the first error correction circuit and the second error correction circuit are provided on a same type of data line.

3. The data transmission circuit according to claim 1, wherein the data strobe circuit comprises a first data strobe and a second data strobe, the first data strobe is connected to a first group of memory blocks of the multiple memory blocks and is connected to the low-bit data port through the first group of data buses, the second data strobe is connected to a second group of memory blocks of the multiple memory blocks and is connected to the high-bit data port through the second group of data buses, a transmission bus is provided between the first data strobe and the second data strobe, the first group of data buses are connected to the second group of memory blocks through the first data strobe, the transmission bus, and the second data strobe, and the second group of data buses are connected to the first group of memory blocks through the second data strobe, the transmission bus, the first data strobe.

4. The data transmission circuit according to claim 3, wherein the transmission bus comprises a first transmission bus and a second transmission bus.

5. The data transmission circuit according to claim 3, wherein the first group of memory blocks comprise a first memory block and a second memory block, and the second group of memory blocks comprise a third memory block and a fourth memory block.

6. A data transmission method, applied to a data transmission circuit, the data transmission circuit comprising:
   a data strobe circuit, connected to multiple memory blocks, connected to a low-bit data port through a first group of data buses, and connected to a high-bit data port through a second group of data buses, wherein each of the first group of data buses and the second group of data buses comprise an odd data line and an even data line; and
   two error correction circuits, wherein a first error correction circuit of the two error correction circuits is provided on the first group of data buses, a second error correction circuit of the two error correction circuits is provided on the second group of data buses, the two error correction circuits are provided on the odd data line or the even data line, the first error correction circuit is configured to perform error correction on data written through the low-bit data port, and the second error correction circuit is configured to perform error correction on data written through the high-bit data port, and
   the method comprising:
      in response to a data write request, writing target data into a target memory block of the multiple memory blocks through a first-type data line or a second-type data line on which the first error correction circuit is provided in the first group of data buses and a first-type data line or a second-type data line on which the second error correction circuit is provided in the second group of data buses, wherein in the first group of data buses and the second group of data buses, one of the first-type data line or the second-type data line is provided with the first error correction circuit and the second error correction circuit, and the other is not provided with the first error correction circuit and the second error correction circuit.

7. The data transmission method according to claim 6, wherein the first group of data buses are connected to a first data strobe, the first data strobe is connected to a first group of memory blocks of the multiple memory blocks, the second group of data buses are connected to a second data strobe, the second data strobe is connected to a second group of memory blocks of the multiple memory blocks, a transmission bus is provided between the first data strobe and the second data strobe, and the method further comprises:
   during alternate writing of first data and second data, writing low-bit data of the first data and low-bit data of the second data through the first-type data line in the first group of data buses and the first data strobe, and writing high-bit data of the first data and high-bit data of the second data through the first-type data line in the second group of data buses and the second data strobe.

8. The data transmission method according to claim 7, wherein during alternate writing of both the first data and the second data into the first group of memory blocks, the high-bit data of the first data and the high-bit data of the second data are written into the first group of memory blocks through the first-type data line in the second group of data buses, the second data strobe, two transmission buses in the transmission bus, and the first data strobe; and
   during alternate writing of both the first data and the second data into the second group of memory blocks, the low-bit data of the first data and the low-bit data of the second data are written into the second group of memory blocks through the first-type data line in the first group of data buses, the first data strobe, the two transmission buses in the transmission bus, and the second data strobe.

9. The data transmission method according to claim 7, wherein the transmission bus comprises a first transmission bus and a second transmission bus, and during respective writing of the first data and the second data into the first group of memory blocks and the second group of memory blocks,
> the low-bit data of the first data is written into the first group of memory blocks through the first-type data line in the first group of data buses and the first data strobe;
> the high-bit data of the first data is written into the first group of memory blocks through the first-type data line in the second group of data buses, the second data strobe, the first transmission bus, and the first data strobe;
> the low-bit data of the second data is written into the second group of memory blocks through the first-type data line in the first group of data buses, the first data strobe, the second transmission bus, and the second data strobe; and
> the high-bit data of the second data is written into the second group of memory blocks through the first-type data line in the second group of data buses and the second data strobe.

10. The data transmission method according to claim 6, further comprising:
> in response to a data read request, reading the target data from the target memory block through the first group of data buses and the second group of data buses.

11. The data transmission method according to claim 10, wherein the first group of data buses are connected to a first data strobe, the first data strobe is connected to a first group of memory blocks of the multiple memory blocks, the second group of data buses are connected to a second data strobe, the second data strobe is connected to a second group of memory blocks of the multiple memory blocks, a transmission bus is provided between the first data strobe and the second data strobe, and the reading the target data from the target memory block through the first group of data buses and the second group of data buses comprises:
> when the target data is stored in the first group of memory blocks, reading low-bit data of the target data to the low-bit data port through the first data strobe and the first-type data line in the first group of data buses, and reading high-bit data of the target data to the high-bit data port through the first data strobe, the transmission bus, the second data strobe, and the first-type data line in the second group of data buses; or
> when the target data is stored in the second group of memory blocks, reading the high-bit data of the target data to the high-bit data port through the second data strobe and the first-type data line in the second group of data buses, and reading the low-bit data of the target data to the low-bit data port through the second data strobe, the transmission bus, the first data strobe, and the first-type data line in the first group of data buses.

12. The data transmission method according to claim 11, wherein the target data comprises first data and second data, the first data and the second data are stored in a same group of memory blocks, and the reading the target data from the target memory block through the first group of data buses and the second group of data buses comprises:
> when both the first data and the second data are stored in the first group of memory blocks, reading low-bit data of the first data to the low-bit data port through the first data strobe and the first-type data line in the first group of data buses, and reading high-bit data of the first data to the high-bit data port through the first data strobe, the transmission bus, the second data strobe, and the first-type data line in the second group of data buses; and reading low-bit data of the second data to the low-bit data port through the first data strobe and the second-type data line in the first group of data buses, and reading high-bit data of the second data to the high-bit data port through the first data strobe, the transmission bus, the second data strobe, and the second-type data line in the second group of data buses; or
> when both the first data and the second data are stored in the second group of memory blocks, reading the high-bit data of the first data to the high-bit data port through the second data strobe and the first-type data line in the second group of data buses, and reading the low-bit data of the first data to the low-bit data port through the second data strobe, the transmission bus, the first data strobe, and the first-type data line in the first group of data buses; and reading the high-bit data of the second data to the high-bit data port through the second data strobe and the second-type data line in the second group of data buses, and reading the low-bit data of the second data to the low-bit data port through the second data strobe, the transmission bus, the first data strobe, and the second-type data line in the first group of data buses.

13. The data transmission method according to claim 11, wherein the target data comprises first data and second data, the first data and the second data are respectively stored in the first group of memory blocks and the second group of memory blocks, the transmission bus comprises a first transmission bus and a second transmission bus, and the reading the target data from the target memory block through the first group of data buses and the second group of data buses comprises:
> reading low-bit data of the first data to the low-bit data port through the first data strobe and the first-type data line in the first group of data buses, and reading high-bit data of the first data to the high-bit data port through the first data strobe, the first transmission bus, the second data strobe, and the first-type data line in the second group of data buses; and
> reading high-bit data of the second data to the high-bit data port through the second data strobe and the second-type data line in the second group of data buses, and reading low-bit data of the second data to the low-bit data port through the second data strobe, the second transmission bus, the first data strobe, and the second-type data line in the first group of data buses.

14. The data transmission method according to claim 6, wherein the first-type data line is an odd data line, and the second-type data line is an even data line; or the first-type data line is an even data line, and the second-type data line is an odd data line.

* * * * *